May 31, 1927.  H. PILOTY  1,631,058

APPARATUS FOR MULTIPLEX PHOTOGRAPHY

Filed Oct. 10, 1924

Fig. 1ª

Inventor
H. Piloty
by Langner, Parry, Card & Langner
Att'ys

Patented May 31, 1927.

1,631,058

UNITED STATES PATENT OFFICE.

HANS PILOTY, OF MUNICH, GERMANY, ASSIGNOR TO THE FIRM OF JOS-PE FARBEN-PHOTO GESELLSCHAFT MIT BESCHRANKTER HAFTUNG, OF HAMBURG, GERMANY.

APPARATUS FOR MULTIPLEX PHOTOGRAPHY.

Application filed October 10, 1924, Serial No. 742,932, and in Switzerland February 13, 1924.

The object of the new apparatus is to produce colored photographs by printing colored pictures one on the other, that is to say, to produce single pictures produced from separate negatives which are taken behind color screens (red, blue, green).

Solutions of the problem of making three part pictures, by splitting the bundles of rays coming from the lens, are known. These solutions, however, have no relation to the distribution of light at places or in points outside of the central axis and therefore, in practical use, cause adumbrations and other defects.

The object of the present invention is to construct an optical system for bringing about the splitting of the light in such manner that an equal distribution of light is possible even for large fields of sight.

To obtain similar light splitting conditions for the straight pencil of rays as well as for the oblique rays, according to the present invention a light splitting mirror is so constructed, that by an extra focal adjustment, i. e., a focussing to the front or to the rear of the focal point with regard to a point at infinity, dispersion figures are created on three ground plates, in the shape of segments, the straight marginal lines of which stand askew vertically to the line of intersection of the two mirror planes forming the light splitting mirror.

A similar effect will also be obtained in a modification of the invention, by a lens which is used together with any kind of mirrors, and of which, within the used angle of image practically only the exit aperture (that is to say, the mounting of the rear lens) acts to border the rays, so that with a lens as well as with a mirror, a limiting or bordering of the rays takes place in the plane of the lens exit aperture.

In the special mode of constructing the apparatus according to this invention, the usual means for sharply focussing are not sufficient. In order to effect a sharp focussing in the apparatus according to the present invention, the rough focussing of the image is effected by shoulders or stops at the same height, for the plate holders on the camera, while the fine-adjustment is carried out by moving the lens or a part of the lens.

In the accompanying drawings:—

Fig. 1 is a diagrammatic view of a light splitting mirror device.

Fig. 1ª is a view from the lens toward the mirror device.

Figure 1:
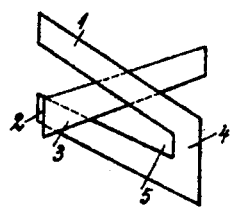
Figure 2:
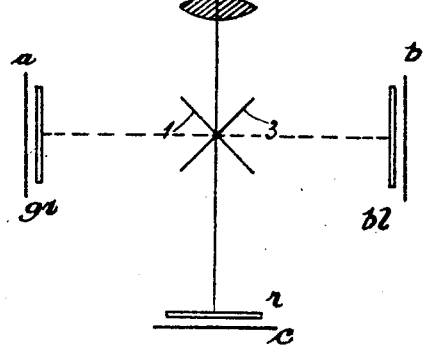
Fig. 2 is a diagrammatic view showing the relative position of the two mirror planes to the lens.

Two mirror strips 1 and 2, in the same plane, are mechanically connected by at least one intermediate piece 4. The plane of these two strips intersects the plane of a mirror strip 3, which passes between 1 and 2, and leaves a free space 5 therebetween, the line of intersection of the strips passing vertically through the optical axis of the lens. It is immaterial what angle the mirror strips make with one another or with the optical axis of the lens. In Fig. 2 the relative position of the two mirror planes to the lens, and to the color screens and part negatives, is shown. It is assumed that each of the two mirror planes stands at an angle of 45° to the optical axis of the lens, and thus the two mirror planes form an angle with each other of 90°. In this figure the relative position of the mirrors with regard to the lens is readily understood. The three part plates $a$, $b$, $c$ are arranged closely behind the green, the red and the blue selection screens $gr$, $r$ and $bl$ in such a manner that the light passing between (that is to say through the free space) the mirrors 1 and 2 will strike the plate $c$ after passing through the red screen, the rays which are reflected by the mirror strips 1 and 2 will strike the plate $b$ after passing through the blue screen, and the rays reflected by the mirror strips 3 will strike the plate $a$, after passing through the green screen.

The use of color screens is so well known in multiplex color photography that it should need no specific explanation.

Figure 3:
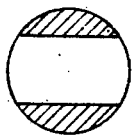
Figs. 3–5 show the dispersion figures obtained on the three ground glass plates.
Figure 4:
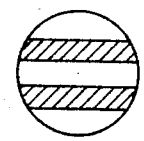
Figure 5:
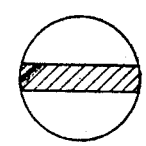

If the mirror system is so arranged that the line of intersection of the two planes of mirror strips stands vertically, and if the three ground plates are adjusted extra focally relative to an axial light point lying at infinity dispersion figures are formed on the three ground-plates, of forms such as are shown in Figs. 3, 4 and 5.

Fig. 3 illustrates dispersion figures, which are produced by the pencil of rays reflected by the two mirror strips 1 and 2. Therefore, it consists of two segments.

One pencil of rays passes through the free spaces between the three mirror strips and produces the dispersion figure of Fig. 4, and consists of two sections.

The third pencil of rays is reflected by the mirror strip 3 and produces the dispersion figure of Fig. 5, which consists of a single segment.

Figure 6:
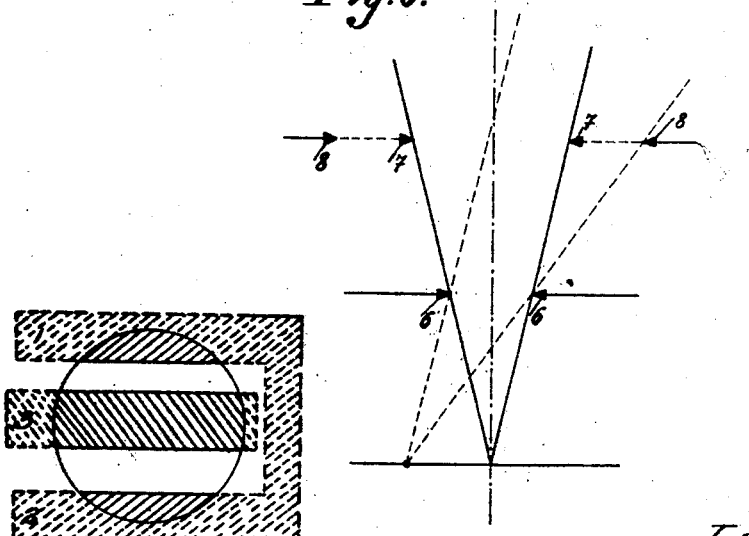
Fig. 6 is a diagrammatic view showing the ray bordering parts of the lens according to a second form of embodiment.

In Fig. 6 the ray bordering parts of the lens are shown diagrammatically according to the second mode of carrying out the invention, and illustrated as relating to the space of the picture. The parts therefore are drafted in such position and size in Fig. 6 as they appear when seen from the inside of the camera. The rear mounting is indicated at 6, and 7 indicates the apparent image of the mounting of a normal lens. In such, as a rule, these two parts of the mounting, 6 and 7, function at the same time to show an axial infinitely distant point, by the shown pencil of rays. In the lens according to the present invention, the mounting of the front lens must not act at its full opening as bordering rays of the oblique pencil of rays shown in dotted lines. The image of the mounting of the front lens must be at least of the size shown at 8 in Fig. 6. With such a lens, when a light splitting takes place near the mounting 6, as desired, a bordering of the rays, as desired, takes place only in the plane of this mounting.

The means for sharp adjustment or focussing of the picture consists, on the one hand, of any usual device for shifting the complete lens, or a part of the lens, along its optical axis, as in common cameras and kinematographic apparatus. This device allows of focussing the picture on the three ground-plates, when the object to be photographed lies between a given minimum distance and infinity. The size of this minimum adjustable distance depends upon how far the lens or the adjustable part of the lens can be shifted with regard to the adjustment for infinity, without allowing irregularities to arise with respect to the distribution of light and sharpness of the picture.

I claim:—

Tricolor photographic apparatus, comprising a lens system; an exit pupil for the lens system and determining the boundary of the rays within the angle of the image; and a light-splitting mirror device positioned immediately behind the lens system, said mirror device comprising, three strip-like mirrors two of which are arranged in a common plane, and the third of which crosses the said two and leaves a free space between the adjacent edges of the two.

Dr. HANS PILOTY.